United States Patent
Han et al.

(10) Patent No.: US 10,927,208 B2
(45) Date of Patent: Feb. 23, 2021

(54) FUNCTIONAL POLYMER OF STYRENE DERIVATIVE AND ANIONIC POLYMERIZATION PREPARATION METHOD THEREOF

(71) Applicant: ZHEJIANG ZHONGLI SYNTHETIC MATERIAL TECHNOLOGY CO., LTD., Zhejiang (CN)

(72) Inventors: Bingyong Han, Beijing (CN); Jian Chen, Zhejiang (CN); Jianmin Lu, Beijing (CN); Minglu Huang, Beijing (CN); Aimin Zhang, Sichuan (CN); Dakui Chen, Zhejiang (CN)

(73) Assignee: ZHEJIANG ZHONGLI SYNTHETIC MATERIAL TECHNOLOGY CO., LTD., Zhejiang (CN)

(*) Notice: Subject to any disclaimer, the term of this patent is extended or adjusted under 35 U.S.C. 154(b) by 130 days.

(21) Appl. No.: 16/086,064

(22) PCT Filed: Mar. 17, 2017

(86) PCT No.: PCT/CN2017/077071
§ 371 (c)(1),
(2) Date: Sep. 18, 2018

(87) PCT Pub. No.: WO2017/157330
PCT Pub. Date: Sep. 21, 2017

(65) Prior Publication Data
US 2019/0292290 A1  Sep. 26, 2019

(30) Foreign Application Priority Data
Mar. 18, 2016 (CN) .......................... 201610157367.3

(51) Int. Cl.
| | | |
|---|---|---|
| C08F 236/10 | (2006.01) | |
| C08F 212/08 | (2006.01) | |
| C08F 297/04 | (2006.01) | |
| C08F 12/22 | (2006.01) | |
| C08F 212/32 | (2006.01) | |
| C08F 12/28 | (2006.01) | |
| C08F 112/32 | (2006.01) | |
| C08F 236/06 | (2006.01) | |
| C08F 236/08 | (2006.01) | |
| C08F 230/04 | (2006.01) | |

(52) U.S. Cl.
CPC ............ *C08F 236/10* (2013.01); *C08F 12/22* (2013.01); *C08F 12/28* (2013.01); *C08F 112/32* (2013.01); *C08F 212/08* (2013.01); *C08F 212/32* (2013.01); *C08F 230/04* (2013.01); *C08F 236/06* (2013.01); *C08F 236/08* (2013.01); *C08F 297/04* (2013.01); *C08F 297/046* (2013.01); *C08F 2800/10* (2013.01)

(58) Field of Classification Search
CPC ........ C08F 212/32; C08F 12/32; C08F 16/16; C08F 30/04; C08F 230/04; C08L 25/02; C08L 25/18
See application file for complete search history.

(56) References Cited

U.S. PATENT DOCUMENTS

| | | | | |
|---|---|---|---|---|
| 3,058,953 A | * | 10/1962 | McMaster | ............... C08F 16/24 526/289 |
| 3,930,047 A | * | 12/1975 | Dale | ..................... C11B 5/0035 426/546 |
| 4,523,000 A | * | 6/1985 | Hatada | .................. C08F 212/32 525/250 |
| 5,436,357 A | * | 7/1995 | Jiang | ..................... B01J 31/122 556/95 |

(Continued)

FOREIGN PATENT DOCUMENTS

| | | |
|---|---|---|
| CN | 101885797 A | 11/2010 |
| CN | 102432717 A | 5/2012 |

(Continued)

OTHER PUBLICATIONS

Hohberger (Towards chiral polystyrene based materials: controlled polymerization of p-(2,2'-diphenylethyl)styrene. Polym. Chem., 2010, 1, pp. 534-539).*

(Continued)

*Primary Examiner* — Brieann R Johnston
(74) *Attorney, Agent, or Firm* — Novick, Kim & Lee, PLLC; Allen Xue

(57) ABSTRACT

A functional polymer of styrene derivative a copolymer of a monomer A having the structure represented by the formula (I) and a comonomer. The functional polymer of styrene derivative of the present invention can be easily further chemically modified. Meanwhile, basic properties of the functional polymer, such as glass transition temperature, viscoelasticity and the like, can be easily adjusted by adjusting the amount of the styrene derivative added.

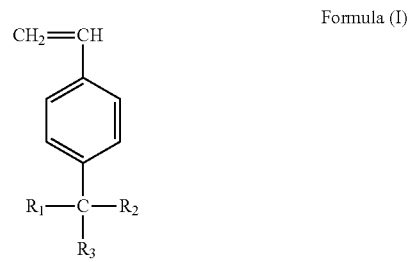

Formula (I)

20 Claims, No Drawings

(56) References Cited

U.S. PATENT DOCUMENTS

| | | | | |
|---|---|---|---|---|
| 5,506,319 A | * | 4/1996 | Takizawa | C08F 230/04 526/248 |
| 2002/0049294 A1 | * | 4/2002 | Shiina | C08K 5/25 526/329.2 |

FOREIGN PATENT DOCUMENTS

| | | | |
|---|---|---|---|
| CN | 102712719 | A | 10/2012 |
| CN | 103547969 | A | 1/2014 |
| JP | H0665190 | A | 3/1994 |
| JP | 2014115642 | A | 6/2014 |

OTHER PUBLICATIONS

Han (Covalent Grafting Approach for Improving the Dispersion of Carbon Black in Styrene-Butadiene Rubber Composites by Copolymerizing p-(2,2'-Diphenylethyl)styrene with a Thermally Decomposed Triphenylethane Pendant. Ind. Eng. Chem. Res. 2016, 55, pp. 9459-9467).*

Hirao (Anionic Polymerization and Reaction of Styrene and 1,1-Diphenylethylene Derivatives Substituted with Alkoxymethyl Groups. Macromol. Chem. Phys. 2001, 202, 3590-3605).*

Lingling Wu et al., "In-chain multi-functionalized polystyrene by living anionic copolymerization with 1,1-bis(4-dimethylaminophenyl)ethylene: Synthesis and effect on the dispersity of carbon black in polymer-based composites", Polymer 54 (2013), pp. 2958-2965.

Kazunori SE, "Anionic living polymerization of useful monomers that can provide intermolecular chemical links", Progress in Polymer Science, 28 (2003), pp. 583-618.

* cited by examiner

FUNCTIONAL POLYMER OF STYRENE DERIVATIVE AND ANIONIC POLYMERIZATION PREPARATION METHOD THEREOF

FIELD OF THE INVENTION

The present invention relates to the field of polymers and preparation method thereof, and specifically relates to a functional polymer of styrene derivative and an anionic polymerization preparation method thereof.

BACKGROUND OF THE INVENTION

A functional polymer refers to a type of polymers obtained by introducing a functional reactive group or a heteroatom into a polymer chain to modify the polymer, which greatly expands the application range of material and plays an important role in promoting polymer blending, improving compatibility with inorganic fillers, and preparing new polymers with different structures. Currently, functionalization of the terminally functionalized polymer is primarily through functional modification of the polymer end with initiators and blocking agents containing functional reactive groups or heteroatoms.

In recent years, polymeric monomers with functional reactive groups or heteroatoms have been developed by researchers, and by the copolymerization of these polymeric monomers with common monomers. A method for preparing in-chain functionalized functional polymers is provided, which can modulate the type, number and position of functional groups to accurately synthesize structurally controllable functional polymers. For example, there are reports on the use of functionalized styrenes such as 1,1-bis(4-dimethylaminophenyl)ethylene [Lingling Wu, Yanshai Wang, Yurong Wang. In-chain multi-functionalized polystyrene by living anionic copolymerization with 1,1-bis (4-dimethylaminophenyl) ethylene: Synthesis and effect on the dispersity of carbon black in polymer-based composites. Polymer 2013; 54, 2958-2965] or tertiary amino styrene (such as N-isopropyl-N-trimethylsilyl-4-vinylbenzylamine, N,N-dimethyl-4-vinylaniline, N,N-dimethyl-4-vinylbenzylamine or N,N-dimethyl-4-vinylphenylethylamine, etc.) [Kazunori Se, Anionic living polymerization of useful monomers that can provide intermolecular chemical links. Prog. Polym. Sci. 2003; 28, 583-618] to copolymerize with common monomers such as styrene and butadiene to obtain in-chain functionalized functional polymers. Such functional polymers mainly introduce hetero atom-containing groups in the side groups of the polymer chain, thereby realizing functionalization and high performance of the polymers. In general, functional monomers have defects such as the complexity of synthetic routes and high cost, which restrict the application in practice. Therefore, it is a significant subject to develop low-cost functional monomers, prepare low-cost functional polymers, and achieve multiple functions of polymers.

The anionic polymerization method is the most typical living polymerization method, which can precisely control the molecular weight and structure of the polymer. At present, the design of synthesizing functional complex polymers with novel structures via anionic living polymerization method has become a research hotspot in the field of polymerization.

However, the existing anionic polymerization method has the following disadvantages: (1) Only a small number of monomers can achieve anionic polymerization while many polymers containing functional groups cannot be prepared via anionic polymerization reaction, which limits the development of polymer varieties. (2) There is high requirement for the choice of comonomers for anionic polymerization, since monomers with relatively large differences in reactivity can hardly perform random copolymerization. Therefore, it is necessary to develop functional monomers suitable for anionic polymerization to expand the range of the anionic polymerization monomers; and at the same time, the copolymerization of the monomer with a conventional anionic polymerization monomer enables the functionalization of the conventional anionic polymerization product.

SUMMARY OF THE INVENTION

It is an object of the present invention to provide a novel functional polymer of a styrene derivative and an anionic polymerization preparation method thereof. The styrene derivative of the present invention can be random or block copolymerized with a conventional monomer such as styrene, a conjugated diene and the like, and the obtained functional polymer can be easily further chemically modified. Meanwhile, basic properties of the functional polymer, such as glass transition temperature, viscoelasticity and the like, can be easily adjusted by adjusting the amount of the styrene derivative added.

According to one aspect of the present invention, a functional polymer of a styrene derivative is provided, which is a copolymer of a monomer A having a structure represented by the formula (I) and a comonomer:

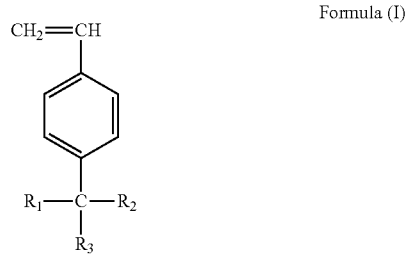

Formula (I)

wherein,
$R_1$, $R_2$ are the same or different and are independently selected from H, $C_{1-6}$ alkyl, $C_{1-6}$ alkoxy;
$R_3$ is selected from $-CR_4R_5R_6$, $-OR_7$, $-SR_8$ or $-SnR_9$;
$R_4$ is selected from H, $C_{1-6}$ alkyl, aryl or heteroaryl, and the alkyl, aryl, heteroaryl may be substituted by a substituent such as $C_{1-6}$ alkyl, $C_{1-6}$ alkoxy, aryl, etc.;
$R_5$ and $R_6$ are the same or different, and $R_5$, $R_6$, $R_7$, $R_8$, and $R_9$ are independently selected from aryl or heteroaryl, and the aryl and heteroaryl may be substituted with a substituent such as $C_{1-6}$ alkyl, $C_{1-6}$ alkoxy, aryl, etc.

According to the invention, the alkyl refers to a straight or branched alkyl having 1 to 6 carbon atoms, such as methyl, ethyl, propyl, isopropyl, butyl, isobutyl, tert-butyl, sec-butyl, pentyl, and neopentyl.

According to the invention, the aryl refers to a monocyclic or polycyclic aromatic group having 6 to 20 (preferably 6 to 14) carbon atoms, and representative aryl includes phenyl, naphthyl, anthryl, pyrenyl, etc.

According to the invention, the heteroaryl refers to a monocyclic or polycyclic heteroaromatic group having 1 to 20 carbon atoms and 1 to 4 heteroatoms selected from N, S and O, and representative heteroaryl includes thienyl, furyl, pyrrolyl, pyridyl, pyrimidinyl, imidazolyl, thiazolyl, indolyl, azanaphthyl, azaanthryl, azapyrenyl, etc.

According to the invention, the comonomer is any monomer which can be copolymerized with the vinyl group in monomer A via an anionic polymerization method. The other comonomer is one or more selected from, but not limited to, styrene, α-methyl styrene or conjugated dienes. The conjugated diene is, for example, butadiene, 1,3-pentadiene, isoprene, etc.

According to the invention, the molar percentage ($M_A$) of monomer A is: $0<M_A<100$ mol %, and the molar percentage ($M_B$) of the comonomer is: $0<M_B<100$ mol %. Preferably, $0<M_A\le 50$ mol %, more preferably $0<M_A\le 20$ mol %, and further more preferably, $0<M_A\le 15$ mol %.

According to the invention, the number average molecular weight (Mn) of the polymer is from 300 to 300,000, preferably from 3,000 to 260,000, and more preferably from 4,000 to 255,000; and a molecular weight distribution MWD is from 1.05 to 2.00, determined by gel permeation chromatograph (GPC).

According to the invention, in the formula (I), preferably, $R_1$ and $R_2$ are the same and are selected from H or $C_{1-6}$ alkyl. Preferably, $R_3$ is selected from —$CR_4R_5R_6$. Preferably, $R_4$ is selected from H or $C_{1-6}$ alkyl; $R_5$ and $R_6$ are the same or different and are independently selected from a substituted or unsubstituted aryl, or a substituted or unsubstituted heteroaryl, wherein the substituent is, for example, $C_{1-6}$ alkyl, $C_{1-6}$ alkoxy, aryl, etc. The aryl is, for example, phenyl, naphthyl; and the heteroaryl is, for example, pyridyl.

According to the invention, in the formula (I), preferably, $R_1$ and $R_2$ are the same and are selected from H, methyl or ethyl; $R_3$ is selected from —$CR_4R_5R_6$; $R_4$ is selected from H, methyl or ethyl; $R_5$ and $R_6$ are the same or different, and are selected from a substituted or unsubstituted phenyl, a substituted or unsubstituted naphthyl, or a substituted or unsubstituted pyridyl, wherein the substituent is, for example, $C_{1-6}$ alkyl, $C_{1-6}$ alkoxy, aryl, etc.

According to another aspect of the invention, a method for preparing the above functional polymer of the styrene derivative is provided, which comprises preparing a copolymer of monomer A and the comonomer by solution polymerization method using butyl lithium as an initiator.

According to the invention, the butyl lithium is, for example, n-butyl lithium, sec-butyl lithium or tert-butyl lithium. More preferably, the butyl lithium is n-butyl lithium.

According to the invention, the specific steps of the method are as follows: adding monomer A and the comonomer to a system containing butyl lithium, an activator and a solvent, and preparing the copolymer by a solution polymerization method.

According to the invention, the solvent is, for example, cyclohexane or a mixture of cyclohexane and hexane (volume ratio of 7:3 to 9:1). The activator is, for example, tetrahydrofuran (THF) or other compounds containing oxygen- or nitrogen- and no active hydrogen such as ethyl tetrahydrofurfuryl ether, tetrahydrofurfuryl-N,N-dimethylamine, etc.

According to the invention, in the system in which monomer A and the comonomer are added, the concentration of the monomers is 5-20 wt %; the molar ratio of butyl lithium to the monomers is 1:(50-3000); and the molar ratio of the activator (such as THF, ethyl tetrahydrofurfuryl ether or tetrahydrofurfuryl-N,N-dimethylamine) to butyl lithium is (0.2-40):1.

According to the invention, the polymerization temperature is 25-100° C.; and the polymerization time is 20 min to 720 min. The solvent is removed after the completion of the polymerization to obtain the copolymer.

According to the invention, if a block copolymer is prepared, a stepwise feeding process is employed.

Beneficial Effect of the Invention

A completely new functional polymer is provided in the present invention, not only expanding monomers for living anionic polymerization, but also enabling further chemical modification by introduction of the functional side group into the polymer due to the complex topological structure of the polymer, which accordingly becomes a functional polymer of great development prospect.

A monomer particularly suitable for living anionic polymerization (such as monomer A having the structure represented by formula (I)) is provided in the present invention, which can be copolymerized with comonomers of various properties and structures via an anionic method due to its low requirement for the choice of comonomers. As a result, a series of copolymers of monomer A and a comonomer are prepared (that is, the functional polymer of the present invention). In addition, basic properties of the functional polymer, such as glass transition temperature, viscoelasticity and the like, can be easily adjusted by adjusting the amount of the styrene derivative added.

DETAILED DESCRIPTION OF THE INVENTION

In the 1980s, Japanese scholar Otsu found that free radicals with low activity or stable structures could be produced by many multi-substituted ethane-type compounds bearing phenyl groups exposed to light or under heating. Among these compounds, those structurally asymmetric could produce two different active compounds. For example, 1,1,2-triphenylethane compound could produce two different free radicals under heat, wherein the free radical of higher activity can be used as an initiator to initiate monomers for free radical polymerization. A type of macromolecular initiator containing such structure in the terminal group was reported by the Chinese patent (Application No.: 201110285596.0) which underwent reversible thermal decomposition by heating to generate free radicals and was capable of initiating free radical polymerization. However, little has been reported about the use of such compounds for the preparation of functional polymers. It has been found by our research that monomer A according to the present invention is a good kind of monomer for living anionic polymerization, which can be copolymerized with other monomers suitable for living anionic polymerization by anionic polymerization method to obtain a type of functional polymers with diverse properties and extensive application.

As described above, a functional polymer of the styrene derivative is provided in the present invention, which is a copolymer of monomer A having a structure represented by formula (I) and a comonomer. It has been found through research that the functional polymer can be easily further chemically modified in addition to being particularly suitable for preparation by an anionic polymerization method; and at the same time, basic properties of the functional polymer, such as glass transition temperature, viscoelasticity and the like, can be easily adjusted by adjusting the amount of the styrene derivative added. Specifically, the above object can be well achieved by controlling the molar percentage of monomer A in the polymer. For example, preferably, $0<M_A\le 50$ mol %, more preferably, $0<M_A\le 20$ mol %, further more preferably, $0<M_A \leq 15$ mol %. It has been found through research that when the $M_A$ is low, general polymer modification can be realized; and when the $M_A$ is high, the polymer will have new properties, such as greatly changed glass transition temperature and viscoelasticicy of the polymer, etc.

As described above, a method for preparing the above functional polymer of the styrene derivative is also provide in the present invention. Specifically, the copolymer of monomer A and the comonomer is prepared by a solution polymerization method using butyl lithium as an initiator.

In one embodiment, a random copolymer is prepared by a solution polymerization method, which comprises adding monomer A and a comonomer to a system containing a solvent selected from cyclohexane or a mixture of cyclohexane and hexane (volume ratio of 7:3 to 9:1), an activator selected from tetrahydrofuran (THF), ethyl tetrahydrofurfuryl ether or tetrahydrofurfuryl-N,N-dimethylamine and an initiator selected from butyl lithium. Wherein, in the system, the concentration of the monomers is 5-20 wt %; the molar ratio of butyl lithium to the monomers is 1/50-1/3000; and the molar ratio of the activator (such as THF, ethyl tetrahydrofurfuryl ether or tetrahydrofurfuryl-N,N-dimethylamine) to butyl lithium is (0.2-40):1. During polymerization, the polymerization temperature is 25-100° C.; the polymerization time is 20 min to 720 min; and the solvent is removed after the completion of the polymerization to obtain the copolymer.

In the present invention, butyl lithium (such as n-butyl lithium, sec-butyl lithium or tert-butyl lithium, preferably n-butyl lithium), which is commonly used in anionic polymerization, is used as an initiator; commonly-used tetrahydrofuran (THF), ethyl tetrahydrofurfuryl ether or tetrahydrofurfuryl-N,N-dimethylamine is used as activator; and according to the present invention, cyclohexane, which is commonly used in anionic solution polymerization, or a mixture of cyclohexane and hexane (volume ratio of 7:3 to 9:1) is used as a solvent. Obviously, the anionic polymerization of monomer A and a comonomer is achieved under simple conditions in the present invention In one embodiment, a block copolymer is prepared using the above solvent, activator and initiator, in the way of stepwise feeding, which is employed in the preparation method of conventional block copolymers. Specifically, the following steps are comprised:

Firstly, adding a certain amount of the solvent and activator to a reaction apparatus and keeping stirring while maintaining the system temperature at 25-100° C. (e.g., 30-70° C., specifically 50° C.), followed by the first stage reaction for 10-30 min with addition of stoichiometric monomer A and the initiator butyl lithium and then the second stage reaction.

Secondly, adding stoichiometric comonomers (such as one or more of styrene, α-methyl styrene or conjugated dienes) to the reaction system for the second stage reaction for 20-80 minutes followed by the third stage reaction.

Thirdly, adding stoichiometric monomer A to the reaction system for the third stage reaction and terminating the reaction after 10-30 minutes, followed by removal of the solvent to obtain the block copolymer. As above, the solvent is cyclohexane or a mixture of cyclohexane and hexane (volume ratio of 7:3 to 9:1); the activator is tetrahydrofuran (THF), ethyl tetrahydrofurfuryl ether or tetrahydrofurfuryl-N,N-dimethylamine; and the butyl lithium is, for example, n-butyl lithium, sec-butyl lithium or tert-butyl lithium, preferably n-butyl lithium.

The embodiments of the present invention are described below by way of specific examples. Those skilled in the art can readily understand other advantages and effects of the present invention from the disclosure of the present description. The present invention may be carried out or applied by different specific embodiments, and the various details in the present description can be modified or changed based on the applications in different aspects without departing from the spirit of the invention.

Example 1 (Preparation of p-(2,2-diphenylethyl)styrene Homopolymer)

A clean bottle for polymerization was baked with flame, evacuated, purged with nitrogen gas for protection and added with 1 g p-(2,2-diphenylethyl)styrene (DPES) monomer (designed molecular weight was 5000) followed by sequential addition of 0.5 ml tetrahydrofuran and 0.154 ml n-butyl lithium solution (1.3 mmol/ml). The mixture was reacted at 40° C. for 6 hours. After the completion of the polymerization, the reaction was terminated with ethanol, precipitated a polymer with a large amount of ethanol and dried in a vacuum oven to obtain the DPES homopolymer. The number average molecular weight of the polymer is 4,800 and the molecular weight distribution of it is 1.06. It indicates that the anionic polymer synthesis of the monomer can be designed according to molecular weight, and the molecular weight distribution of the product is narrow. The glass transition temperature of the polymer is 89° C.

The test data of the homopolymer is shown in Table 1.

Example 2 (Preparation of DPES-butadiene Random Copolymer)

A clean bottle for polymerization was baked with flame, evacuated, purged with nitrogen gas for protection, added with 0.3 g of DPES monomer, followed by introduction of 10 ml cyclohexane solution of butadiene (Bd) (7 g Bd/100 ml cyclohexane) with a pipette, and then successively added with 0.0096 mmol tetrahydrofurfuryl-N,N-dimethylamine and 0.0192 ml n-butyl lithium solution (1.3 mmol/ml). The mixture was reacted at 40° C. for 6 hours. After the completion of the polymerization, the reaction was terminated with ethanol, precipitated a polymer with a large amount of ethanol and dried in a vacuum oven to obtain the DPES-butadiene random copolymer in which the molar percentage of DPES was 7.56 mol %.

The test data of the DPES-butadiene random copolymer is shown in Table 1.

Example 3 (Preparation of DPES-styrene Random Copolymer)

A clean bottle for polymerization was baked with flame, evacuated, purged with nitrogen gas for protection, and successively added with 0.45 g DPES monomer, 10 ml cyclohexane, 1.05 g styrene (St), 0.0039 mmol tetrahydrofurfuryl-N,N-dimethylamine and 0.0077 ml n-butyl lithium solution (1.3 mmol/mL). The mixture was reacted at 40° C. for 6 hours. After the completion of the polymerization, the reaction was terminated with ethanol, precipitated a polymer with a large amount of ethanol and dried in a vacuum oven to obtain the DPES-styrene random copolymer in which the molar percentage of DPES was 13.53 mol %.

The test data of the DPES-styrene random copolymer is shown in Table 1.

Example 4 (Preparation of DPES-isoprene Random Copolymer)

A clean bottle for polymerization was baked with flame, evacuated, purged with nitrogen gas for protection, and successively added with 0.45 g DPES monomer, 10 ml cyclohexane, 1.05 gisoprene (Ip), 0.0016 mmol tetrahydrofurfuryl-N,N-dimethylamine and 0.0031 ml n-butyl lithium solution (1.3 mmol/ml). The mixture was reacted at 50° C. for 6 hours. After the completion of the polymerization, the reaction was terminated with ethanol, precipitated a polymer with a large amount of ethanol and dried in a vacuum oven to obtain the DPES-isoprene random copolymer in which the molar percentage of DPES was 9.28 mol %.

The test data of the DPES-isoprene random copolymer is shown in Table 1.

Example 5 (Preparation of DPES-styrene-butadiene Ternary Random Copolymer)

A clean bottle for polymerization was baked with flame, evacuated, purged with nitrogen gas for protection, added with 0.2 g DPES monomer, followed by introduction of 10 ml cyclohexane solution of butadiene (Bd) (7 g Bd/100 ml cyclohexane) with a pipette, and then successively added with 0.2 g styrene, 0.077 mmol tetrahydrofurfuryl-N,N-dimethylamine and 0.154 ml n-butyl lithium solution (1.3 mmol/ml). The mixture was reacted at 40° C. for 6 hours. After the completion of the polymerization, the reaction was terminated with ethanol, precipitated a polymer with a large amount of ethanol and dried in a vacuum oven to obtain the DPES-styrene-butadiene ternary random copolymer in which the molar percentage of DPES was 4.52 mol %.

The test data of the DPES-styrene-butadiene ternary random copolymer is shown in Table 1.

Example 6 (Preparation of p-(N,N-diphenylaminomethyl)styrene Homopolymer)

A clean bottle for polymerization was baked with flame, evacuated, purged with nitrogen gas for protection, added with 1 g p-(N,N-diphenylaminomethyl)styrene (DPAMS) monomer (designed molecular weight was 5000), followed by sequential addition of 0.5 ml tetrahydrofuran, 10 ml cyclohexane and 0.154 ml n-butyl lithium solution (1.3 mmol/ml). The mixture was reacted at 40° C. for 6 hours. After the completion of the polymerization, the reaction was terminated with ethanol, precipitated a polymer with a large amount of ethanol and dried in a vacuum oven to obtain the DPAMS homopolymer.

The test data of the DPAMS homopolymer is shown in Table 1.

Example 7 (Preparation of DPAMS-butadiene Random Copolymer)

A clean bottle for polymerization was baked with flame, evacuated, purged with nitrogen gas for protection, added with 0.45 g DPAMS monomer, followed by introduction of 10 ml cyclohexane solution of butadiene (Bd) (7 g Bd/100 ml cyclohexane) with a pipette, and then successively added with 0.0016 ml tetrahydrofurfuryl-N,N-dimethylamine and 0.0031 ml n-butyl lithium solution (1.3 mmol/ml). The mixture was reacted at 40° C. for 6 hours. After the completion of the polymerization, the reaction was terminated with ethanol, precipitated a polymer with a large amount of ethanol and dried in a vacuum oven to obtain the DPAMS-butadiene random copolymer in which the molar percentage of DPAMS was 10.86 mol %.

The test data of the DPAMS-butadiene random copolymer is shown in Table 1.

Example 8 (Preparation of DPAMS-styrene Random Copolymer)

A clean bottle for polymerization was baked with flame, evacuated, purged with nitrogen gas for protection, added with 0.3 g DPAMS monomer, followed by sequential addition of 10 ml cyclohexane, 0.7 g styrene, 0.0039 mmol tetrahydrofurfuryl-N,N-dimethylamine and 0.0077 ml n-butyl lithium solution (1.3 mmol/mL). The mixture was reacted 40° C. for 6 hours. After the completion of the polymerization, the reaction was terminated with ethanol, precipitated a polymer with a large amount of ethanol and dried in a vacuum oven to obtain the DPAMS-styrene random copolymer in which the molar percentage of DPAMS was 13.53 mol %.

The test data of the DPAMS-styrene random copolymer is shown in Table 1.

Example 9 (Preparation of DPAMS-isoprene Random Copolymer)

A clean bottle for polymerization was baked with flame, evacuated, purged with nitrogen gas for protection, added with 0.3 g DPAMS monomer, followed by sequential addition of 10 ml cyclohexane, 0.7 g isoprene and 0.011 mmol tetrahydrofurfuryl-N,N-dimethylamine and 0.022 ml n-butyl lithium solution (1.3 mmol/ml). The mixture was reacted at 40° C. for 6 hours. After the completion of the polymerization, the reaction was terminated with ethanol, precipitated a polymer with a large amount of ethanol and dried in a vacuum oven to obtain the DPAMS-isoprene random copolymer in which the molar percentage of DPAMS was 9.28 mol %.

The test data of the DPAMS-isoprene random copolymer is shown in Table 1.

Example 10 (Preparation of DPAMS-styrene-butadiene Ternary Random Copolymer)

A clean bottle for polymerization was baked with flame, evacuated, purged with nitrogen gas for protection, added with 0.1 g DPAMS monomer, followed by introduction of 10 ml cyclohexane solution of butadiene (Bd) (7 g Bd/100 ml cyclohexane) with a pipette, and then successively added with 0.2 g styrene, 0.077 mmol tetrahydrofurfuryl-N,N-dimethylamine and 0.154 ml n-butyl lithium solution (1.3 mmol/ml). The mixture was reacted at 40° C. for 6 hours. After the completion of the polymerization, the reaction was terminated with ethanol, precipitated a polymer with a large amount of ethanol and dried in a vacuum oven to obtain the DPAMS-styrene-butadiene ternary random copolymer in which the molar percentage of DPAMS was 2.30 mol %.

The test data of the DPAMS-styrene-butadiene ternary random copolymer is shown in Table 1.

Example 11 (Preparation of p-(2,2-bis(4-dimethylaminophenyl)ethyl)styrene Homopolymer)

A clean bottle for polymerization was baked with flame, evacuated, purged with nitrogen gas for protection, added with 1 g p-(2,2-bis(4-dimethylaminophenyl)ethyl)styrene (DMAPES) monomer (designed molecular weight was 5000), followed by sequential addition of 0.5 ml tetrahydrofuran, 10 ml cyclohexane and 0.154 ml n-butyl lithium solution (1.3 mmol/ml). The mixture was reacted at 40° C. for 6 hours. After the completion of the polymerization, the reaction was terminated with ethanol, precipitated a polymer with a large amount of ethanol and dried in a vacuum oven to obtain the DMAPES homopolymer.

The test data of the DMAPES homopolymer is shown in Table 1.

Example 12 (Preparation of DMAPES-butadiene Random Copolymer)

A clean bottle for polymerization was baked with flame, evacuated, purged with nitrogen gas for protection, added with 0.45 g DMAPES monomer, followed by introduction of 10 ml cyclohexane solution of butadiene (Bd) (7 g Bd/100 ml cyclohexane) with a pipette, and then successively added with 0.0019 mmol tetrahydrofurfuryl-N,N-dimethylamine and 0.0038 ml n-butyl lithium solution (1.3 mmol/ml). The mixture was reacted at 40° C. for 6 hours. After the completion of the polymerization, the reaction was terminated with ethanol, precipitated a polymer with a large amount of ethanol and dried in a vacuum oven to obtain the DMAPES-butadiene random copolymer in which the molar percentage of DMAPES was 8.58 mol %.

The test data of the DMAPES-butadiene random copolymer is shown in Table 1.

Example 13 (Preparation of DMAPES-styrene Random Copolymer)

A clean bottle for polymerization was baked with flame, evacuated, purged with nitrogen gas for protection, added with 0.3 g of DMAPES monomer, followed by sequential addition of 10 ml cyclohexane, 0.7 g styrene and 0.0039 mmol tetrahydrofurfuryl-N,N-dimethylamine, and 0.0077 ml n-butyl lithium solution (1.3 mmol/mL). The mixture was reacted at 40° C. for 6 hours. After the completion of the polymerization, the reaction was terminated with ethanol, precipitated a polymer with a large amount of ethanol and dried in a vacuum oven to obtain the DMAPES-styrene random copolymer in which the molar percentage of DMAPES was 10.75 mol %.

The test data of the DMAPES-styrene random copolymer is shown in Table 1.

Example 14 (Preparation of DMAPES-isoprene Random Copolymer)

A clean bottle for polymerization was baked with flame, evacuated, purged with nitrogen gas for protection, added with 0.3 g of DMAPES monomer, followed by sequential addition of 10 ml cyclohexane, 0.7 g isoprene, 0.0096 mmol tetrahydrofurfuryl-N,N-dimethylamine, and 0.0192 n-butyl lithium solution (1.3 mmol/ml). The mixture was reacted at 40° C. for 6 hours. After the completion of the polymerization, the reaction was terminated with ethanol, precipitated a polymer with a large amount of ethanol and dried in a vacuum oven to obtain the DMAPES-isoprene random copolymer in which the molar percentage of DMAPES was 7.30 mol %.

The test data of the DMAPES-isoprene random copolymer is shown in Table 1.

Example 15 (Preparation of DMAPES-styrene-butadiene Ternary Random Copolymer)

A clean bottle for polymerization was baked with flame, evacuated, purged with nitrogen gas for protection, added with 0.1 g DMAPES monomer, followed by introduction of 10 ml of cyclohexane solution of butadiene (Bd) (concentration was 7 g Bd/100 ml cyclohexane) with a pipette, and then successively added with 0.2 g styrene, 0.077 mmol tetrahydrofurfuryl-N,N-dimethylamine, and 0.154 ml n-butyl lithium solution (1.3 mmol/ml). The mixture was reacted at 40° C. for 6 hours. After the completion of the polymerization, the reaction was terminated with ethanol, precipitated a polymer with a large amount of ethanol and dried in a vacuum oven to obtain the DMAPES-styrene-butadiene ternary random copolymer in which the molar percentage of DMAPES was 1.78 mol %.

The test data of the DMAPES-styrene-butadiene ternary random copolymer is shown in Table 1.

Example 16 (Preparation of p-(phenoxymethyl)styrene Homopolymer)

A clean bottle for polymerization was baked with flame, evacuated, purged with nitrogen gas for protection, added with 1 g p-(phenoxymethyl)styrene (PBOMS) monomer (designed molecular weight was 5000), followed by sequential addition of 0.5 ml tetrahydrofuran, 10 ml cyclohexane and 0.154 ml a n-butyl lithium solution (concentration of 1.3 mmol/ml). The mixture was reacted at 40° C. for 6 hours. After the completion of the polymerization, the reaction was terminated with ethanol, precipitated a polymer with a large amount of ethanol and dried in a vacuum oven to obtain the PBOMS homopolymer.

The test data of the PBOMS homopolymer is shown in Table 1.

Example 17 (Preparation of PBOMS-butadiene Random Copolymer)

A clean bottle for polymerization was baked with flame, evacuated, purged with nitrogen gas for protection, added with 0.45 g of p-(phenoxymethyl)styrene (PBOMS) monomer, followed by introduction of 10 ml of cyclohexane solution of butadiene (Bd) (concentration was 7 g Bd/100 ml cyclohexane) with a pipette, and then successively added with 0.0193 mmol tetrahydrofurfuryl-N,N-dimethylamine and 0.0385 ml n-butyl lithium solution (1.3 mmol/ml). The mixture was reacted at 40° C. for 6 hours. After the completion of the polymerization, the reaction was terminated with ethanol, precipitated a polymer with a large amount of ethanol and dried in a vacuum oven to obtain the PBOMS-butadiene random copolymer in which the molar percentage of PBOMS was 14.42 mol %.

The test data of the PBOMS-butadiene random copolymer is shown in Table 1.

Example 18 (Preparation of PBOMS-styrene Random Copolymer)

A clean bottle for polymerization was baked with flame, evacuated, purged with nitrogen gas for protection, added with 0.3 g of PBOMS monomer, followed by sequential addition of 10 ml cyclohexane, 0.7 g styrene, 0.0039 mmol tetrahydrofurfuryl-N,N-dimethylamine and 0.0077 ml n-butyl lithium solution (1.3 mmol/mL). The mixture was reacted at 40° C. for 6 hours. After the completion of the polymerization, the reaction was terminated with ethanol, precipitated a polymer with a large amount of ethanol and dried in a vacuum oven to obtain the PBOMS-styrene random copolymer in which the molar percentage of PBOMS was 17.78 mol %.

The test data of the PBOMS-styrene random copolymer is shown in Table 1.

Example 19 (Preparation of PBOMS-isoprene Random Copolymer)

A clean bottle for polymerization was baked with flame, evacuated, purged with nitrogen gas for protection, added with 0.3 g of PBOMS monomer, followed by addition of 10 ml cyclohexane, 0.7 g isoprene, 0.0096 mmol tetrahydrofuryl-N,N-dimethylamine and 0.0192 ml n-butyl lithium solution (1.3 mmol/ml). The mixture was reacted at 40° C. for 6 hours. After the completion of the polymerization, the reaction was terminated with ethanol, precipitated a polymer with a large amount of ethanol and dried in a vacuum oven to obtain the PBOMS-isoprene random copolymer in which the molar percentage of PBOMS was 12.39 mol %.

The test data of the PBOMS-isoprene random copolymer is shown in Table 1.

Example 20 (Preparation of PBOMS-styrene-butadiene Ternary Random Copolymer)

A clean bottle for polymerization was baked with flame, evacuated, purged with nitrogen gas for protection, added with PBOMS monomer, followed by introduction of 10 ml cyclohexane solution of butadiene (Bd) (7 g Bd/100 ml cyclohexane) with a pipette, and then successively added with 0.2 g styrene, 0.077 mmol tetrahydrofurfuryl-N,N-dimethylamine and 0.154 ml n-butyl lithium solution (1.3 mmol/ml). The mixture was reacted at 40° C. for 6 hours. After the completion of the polymerization, the reaction was terminated with ethanol, precipitated a polymer with a large amount of ethanol and dried in a vacuum oven to obtain the PBOMS-styrene-butadiene ternary random copolymer in which the molar percentage of PBOMS was 3.16 mol %.

The test data of the PBOMS-styrene-butadiene ternary random copolymer is shown in Table 1.

TABLE 1

Test data of Examples 1-20

| Example | Number average molecular weight | Molecular weight distribution |
|---------|--------------------------------|------------------------------|
| 1 | 4800 | 1.06 |
| 2 | 36000 | 1.10 |
| 3 | 113100 | 1.18 |
| 4 | 231100 | 1.18 |
| 5 | 4900 | 1.09 |
| 6 | 5300 | 1.09 |
| 7 | 245000 | 1.20 |
| 8 | 102000 | 1.18 |
| 9 | 34500 | 1.15 |
| 10 | 5100 | 1.05 |
| 11 | 5500 | 1.05 |
| 12 | 213700 | 1.20 |
| 13 | 112600 | 1.23 |
| 14 | 38000 | 1.15 |
| 15 | 4800 | 1.05 |
| 16 | 5100 | 1.05 |
| 17 | 22000 | 1.09 |
| 18 | 99000 | 1.11 |
| 19 | 35900 | 1.11 |
| 20 | 5100 | 1.23 |

Example 21

The DPES-butadiene random copolymer in Example 2 was taken as an example. The glass transition temperature of the DPES-butadiene random copolymer is changed as shown in Table 2 by adjusting the amount of the DPES added.

TABLE 2

| No. | Molar percentage of DPES | Glass transition temperature (Tg) (° C.) |
|-----|--------------------------|------------------------------------------|
| 1 | 0.5 | −55 |
| 2 | 1 | −52 |
| 3 | 2 | −50 |
| 4 | 3 | −45 |
| 5 | 8 | −30 |

The invention claimed is:

1. A functional polymer of a styrene derivative, wherein the polymer is a copolymer of a monomer (A) having the structure represented by the formula (I) and a comonomer:

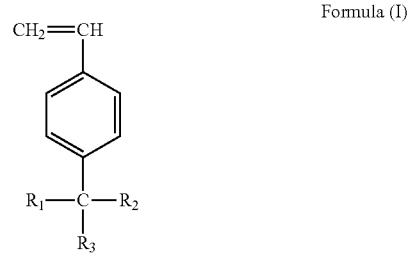

Formula (I)

wherein,
R$_1$, R$_2$ are the same or different and are independently selected from H, C$_{1-6}$ alkyl, and C$_{1-6}$ alkoxy;
R$_3$ is selected from —CR$_4$R$_5$R$_6$ or —SnR$_9$;
R$_4$ is selected from H, unsubstituted C$_{1-6}$ alkyl, unsubstituted aryl or unsubstituted heteroaryl, substituted alkyl, substituted aryl, substituted heteroaryl in which the substituent is C$_{1-6}$ alkyl, C$_{1-6}$ alkoxy, aryl;
R$_5$ and R$_6$ are the same or different, and R$_5$, R$_6$, and R$_9$ are independently selected from unsubstituted aryl, unsubstituted heteroaryl, substituted aryl, and substituted heteroaryl, wherein the substituent is C$_{1-6}$ alkyl, C$_{1-6}$ alkoxy, or aryl,
wherein the comonomer is one or more selected from styrene, α-methyl styrene, and conjugated dienes.

2. The functional polymer of the styrene derivative according to claim 1,
wherein the alkyl group is a straight or branched alkyl having 1 to 6 carbon atoms,
the aryl group is a monocyclic or polycyclic aromatic group having 6 to 20 carbon atoms, the heteroaryl group is a monocyclic or polycyclic heteroaromatic group having 1 to 20 carbon atoms and 1 to 4 heteroatoms independently selected from N, S, and O.

3. The functional polymer of the styrene derivative according to claim 1, wherein the conjugated diene is butadiene, 1,3-pentadiene, or isoprene.

4. The functional polymer of the styrene derivative according to claim 1, wherein a molar percentage ($M_A$) of monomer (A) is: $0<M_A<100$ mol %, and a molar percentage ($M_B$) of the comonomer is: $0<M_B<100$ mol %.

5. The functional polymer of the styrene derivative according to claim 1, wherein, $R_1$ and $R_2$ are the same and are H or $C_{1-6}$ alkyl, $R_3$ is —$CR_4R_5R_6$, $R_4$ is H or $C_{1-6}$ alkyl, $R_5$ and $R_6$ are the same or different and are independently selected from substituted aryl, unsubstituted aryl, substituted heteroaryl, and unsubstituted heteroaryl, wherein the substituent is $C_{1-6}$ alkyl, $C_{1-6}$ alkoxy, or aryl.

6. A method for preparing the functional polymer of the styrene derivative, comprising preparing a copolymer of monomer (A) and a comonomer by solution polymerization using butyl lithium as an initiator,
wherein monomer (A) has a structure of formula (I)

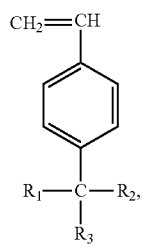

Formula (I)

wherein,
$R_1$ and $R_2$ are the same or different and are independently selected from H, $C_{1-6}$ alkyl, and $C_{1-6}$ alkoxy;
$R_3$ is —$CR_4R_5R_6$, —$OR_7$, —$SR_8$, or —$SnR_9$;
$R_4$ is selected from H, substituted $C_{1-6}$ alkyl, unsubstituted $C_{1-6}$ alkyl, substituted aryl, unsubstituted aryl, substituted heteroaryl, and unsubstituted heteroaryl, wherein the substitute is $C_{1-6}$ alkyl, $C_{1-6}$ alkoxy, or aryl;
$R_5$, $R_6$, $R_7$, $R_8$, and $R_9$ are independently selected from substituted aryl, unsubstituted aryl, substituted heteroaryl, and unsubstituted heteroaryl, wherein the substituent is $C_{1-6}$ alkyl, $C_{1-6}$ alkoxy, or aryl.

7. The preparation method according to claim 6, wherein solution polymerization is carried out by in a solution comprising monomer (A), the comonomer, butyl lithium, an activator, and a solvent.

8. The preparation method according to claim 7, wherein a sum of monomer (A) and the comonomer is 5-20 wt % based on a weight of the solution, a molar ratio of butyl lithium to the sum of monomer (A) and the comonomer is 1:(50-3000); and a molar ratio of the activator to butyl lithium is (0.2-40):1.

9. The preparation method according to claim 6, wherein monomer (A) and the comonomer are added in the solution in two separate steps, and the copolymer is a block copolymer.

10. The functional polymer of the styrene derivative according to claim 2,
wherein the alkyl group is methyl, ethyl, propyl, isopropyl, butyl, isobutyl, tert-butyl, sec-butyl, pentyl, or neopentyl;
the aryl group is phenyl, naphthyl, anthryl, or pyrenyl;
the heteroaryl group is thienyl, furyl, pyrrolyl, pyridyl, pyrimidinyl, imidazolyl, thiazolyl, indolyl, azanaphthyl, azaanthryl, or azapyrenyl.

11. The functional polymer of the styrene derivative according to claim 4, wherein $0<M_A\leq50$ mol %.

12. The functional polymer of the styrene derivative according to claim 4, wherein $0<M_A\leq20$ mol %.

13. The functional polymer of the styrene derivative according to claim 4, wherein $0<M_A\leq15$ mol %.

14. The functional polymer of the styrene derivative according to claim 1, a number average molecular weight (Mn) of the copolymer is from 300 to 300,000, and a molecular weight distribution (MWD) of the copolymer is from 1.05 to 2.00, determined by gel permeation chromatograph (GPC).

15. The functional polymer of the styrene derivative according to claim 14, wherein the number average molecular weight Mn of the copolymer is from 4,000 to 255,000.

16. The functional polymer of the styrene derivative according to claim 1, wherein, $R_1$ and $R_2$ are the same and are H, methyl, or ethyl; $R_3$ is —$CR_4R_5R_6$; $R_4$ is H, methyl, or ethyl; $R_5$ and $R_6$ are the same or different, and are selected from substituted phenyl, unsubstituted phenyl, substituted napthyl, unsubstituted naphthyl, substituted pyridyl, and unsubstituted pyridyl, wherein the substituent is $C_{1-6}$ alkyl, $C_{1-6}$ alkoxy, or aryl.

17. The preparation method according to claim 6, wherein the butyl lithium is n-butyl lithium, sec-butyl lithium, or tert-butyl lithium.

18. The preparation method according to claim 7, wherein the solvent is cyclohexane or a mixture of cyclohexane and hexane, the activator is selected from tetrahydrofuran (THF) and an oxygen- or nitrogen-containing but active hydrogen-free compound.

19. The preparation method according to claim 18, wherein the active hydrogen-free compound is ethyl tetrahydrofurfuryl ether or tetrahydrofurfuryl-N,N-dimethylamine.

20. The preparation method according to claim 7, wherein, the polymerization temperature is 25-100° C. and the polymerization time is 20 min to 720 min.

* * * * *